Feb. 9, 1954
C. B. GARLAND
2,668,625
TELESCOPIC HOISTING BOOM
Filed Jan. 9, 1953
3 Sheets-Sheet 1
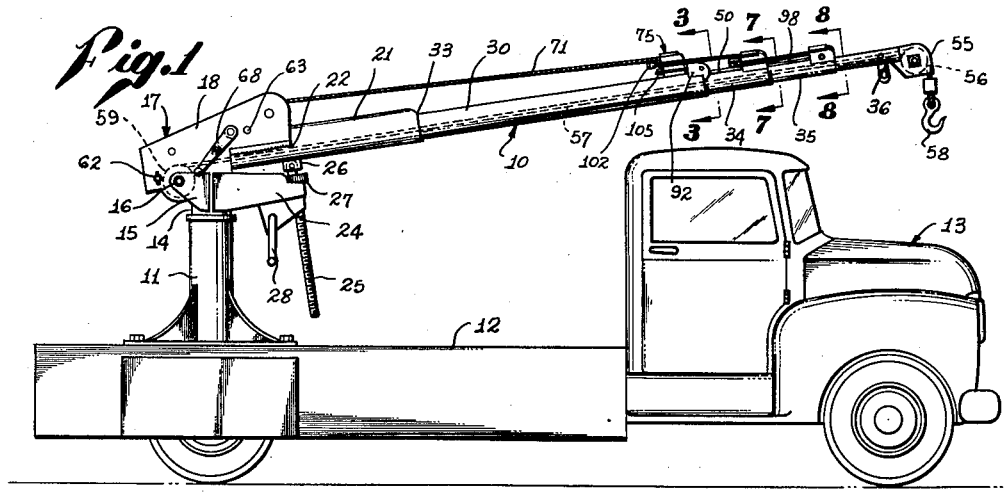
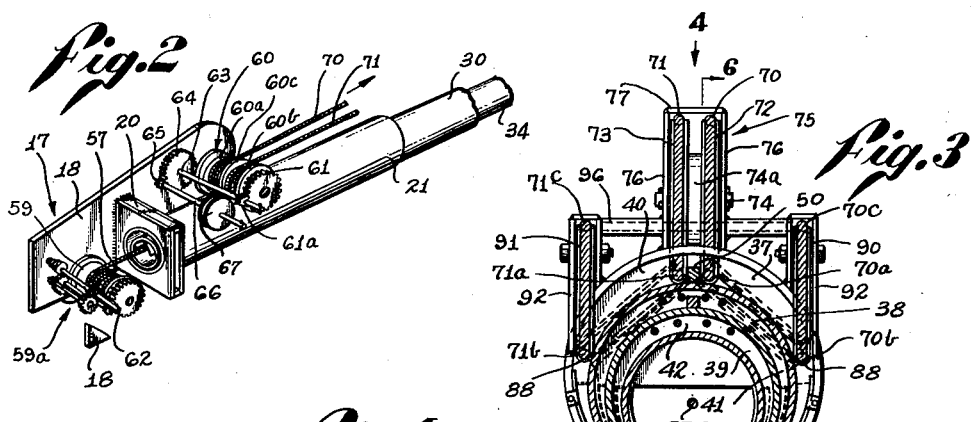
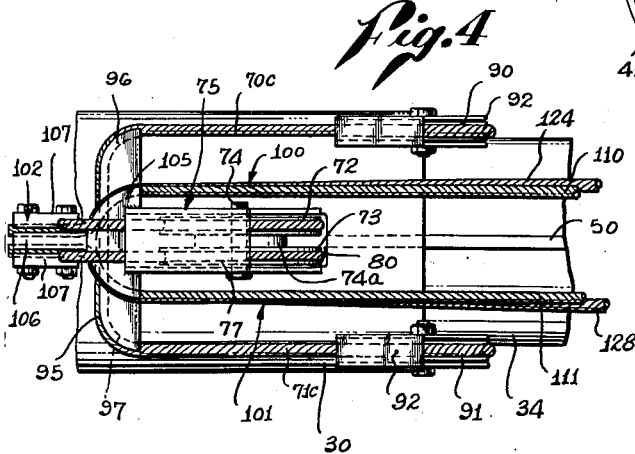
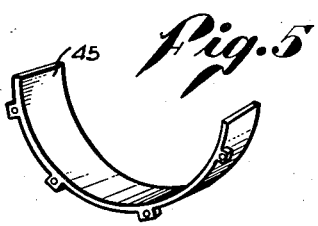
INVENTOR.
CLAUDE B. GARLAND
BY
Attorney

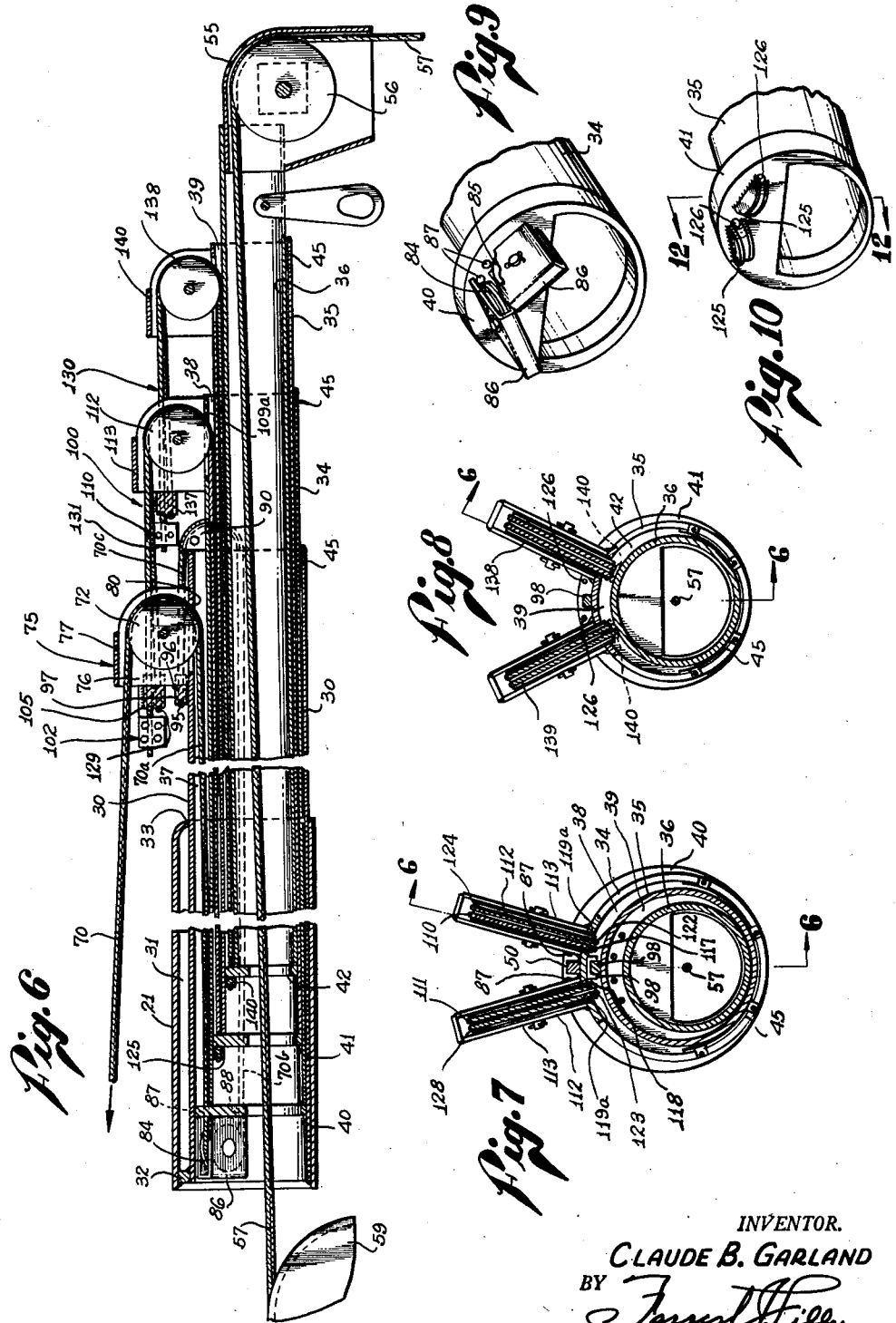

Feb. 9, 1954 — C. B. GARLAND — 2,668,625
TELESCOPIC HOISTING BOOM
Filed Jan. 9, 1953 — 3 Sheets-Sheet 3
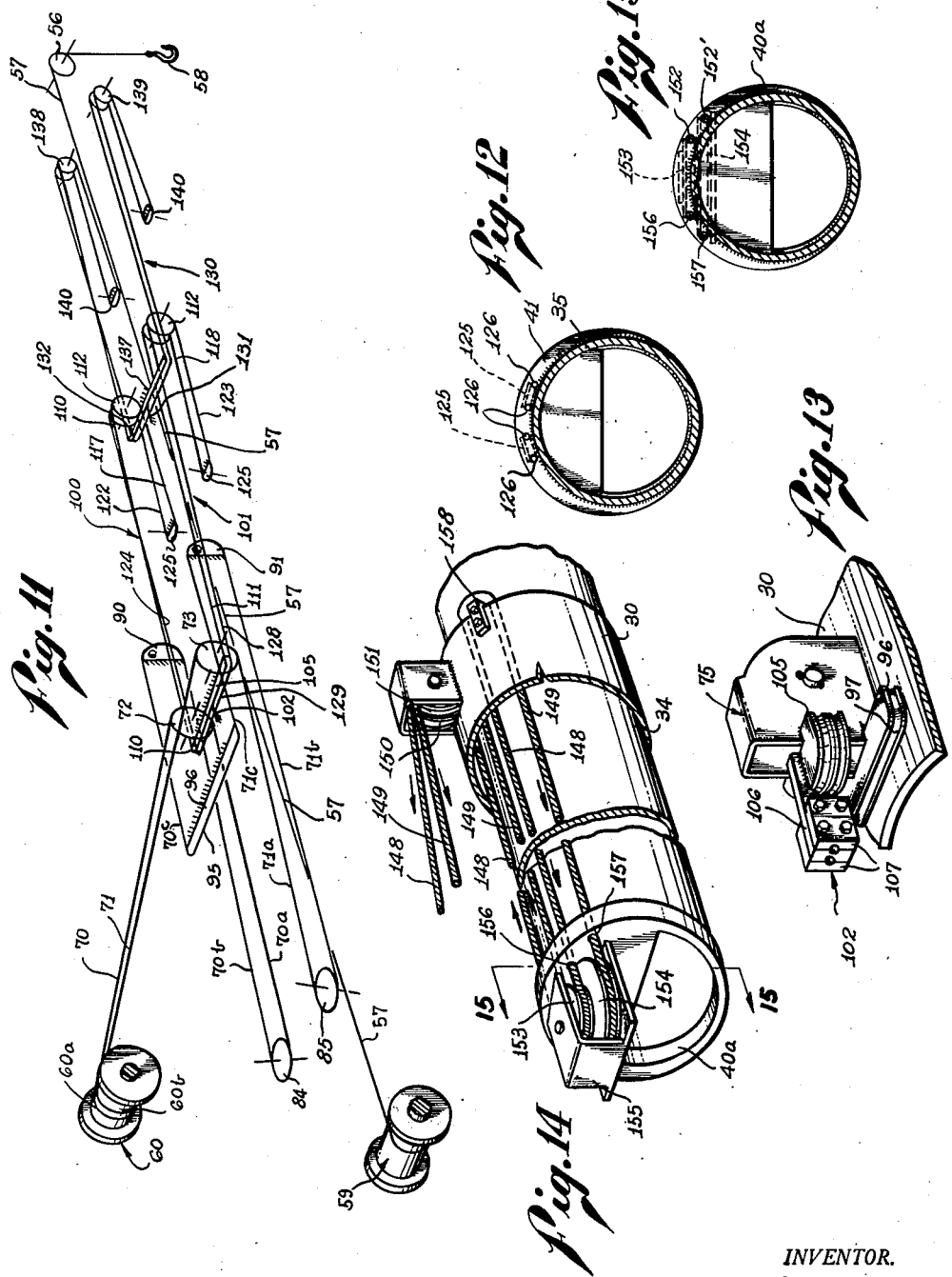
INVENTOR.
CLAUDE B. GARLAND
BY Forrest J. Lilly
Attorney Patented Feb. 9, 1954

2,668,625

UNITED STATES PATENT OFFICE 2,668,625

TELESCOPIC HOISTING BOOM

Claude B. Garland, Compton, Calif., assignor of one-half to Carl Frye, Long Beach, Calif.

Application January 9, 1953, Serial No. 330,516

6 Claims. (Cl. 212—55)

This invention relates generally to telescopic truck-mounted booms for light hoisting, of the general type disclosed in my prior Patent No. 2,571,858.

Briefly described, such a boom comprises a plurality of telescopically arranged tubes, of progressively smaller diameter, the larger tube being mounted for pivotal action about horizontal and vertical axes, and there being provided cable and pulley arrangements for extending each tube from the next larger or lower tube, in such arrangement that all of the tubes can be extended simultaneously from a compact fully telescoped carrying position to a partially or fully extended operating position. Each tube is sufficiently smaller in diameter than the preceding tube to accommodate these cable and pulley arrangements, and in a preferred embodiment, the tubes are placed in eccentric positions within one another so as to provide a maximum of space for the cables. With the latter arrangement, the difference in diameter from tube to tube necessary to accommodate the cables is minimized, and the diameter of the largest tube of the series need not be overly large, nor the diameter of the smallest tube undesirably small.

A general object of the present invention is the provision of such a telescopic, extensible boom having increased cable strength for heavy duty service. Obviously, for additional cable strength, a larger cable might be employed, but a cable larger than is now being used in this type of equipment becomes stiff and unwieldy, and cannot easily be threaded and pulled around pulleys and guides of the largest sizes that can easily be used in such an apparatus. Obviously also, additional cables could be employed, simply in duplication of those arranged as in my prior patent, but unless the multiple cables are made of precisely the same length—a condition virtually impossible of achievement in practice—only the shorter cable would carry the load, and any slightly longer cable would remain slack and of no advantage beyond stand-by service, to assume the load in the event that the first cable should part.

Accordingly a more specific object is the provision of a multiple cable arrangement, with provision for equalization of the load between the several cable flights or courses.

According to the invention, multiple cable flights or courses are formed from single cables, with successive courses looped about equalizing guides, so that the loads assumed by the several courses are automatically equalized. The invention consists in the cable, pulley and equalizing guide arrangements by which this advantage is achieved.

The invention will be more fully understood from the following detailed description of one present illustrative embodiment thereof, reference for this purpose being had to the accompanying drawings, in which:

Figure 1 is a side elevational view of a boom in accordance with the present invention mounted in a conventional manner on the platform of a carrying truck;

Figure 2 is a fragmentary perspective view of the lower end portion of the boom of the invention;

Figure 3 is a transverse section taken on line 3—3 of Figure 1;

Figure 4 is a plan view of a portion of the boom, taken as indicated by the arrow 4 in Figure 3;

Figure 5 is a perspective view of a bearing;

Figure 6 is a longitudinal sectional view of the boom of the invention, the plane of the section being adjusted to pass through pulley housings at the ends of the several tube sections as indicated by the arrows 6 in Figures 3, 7 and 8;

Figure 7 is a transverse section as taken on line 7—7 of Figure 1;

Figure 8 is a transverse section taken as indicated by line 8—8 of Figure 1;

Figure 9 is a perspective view of the rearward end of one of the telescopic boom sections;

Figure 10 is a perspective view of the rearward end portion of the next smaller telescopic boom section;

Figure 11 is a diagrammatic view in perspective showing schematically the cable and pulley arrangement of the boom of the present invention;

Figure 12 is a transverse section taken as indicated by the line 12—12 of Figure 10;

Figure 13 is a perspective of a pulley housing and cable guide and clamping means on the outer end of the first boom section;

Figure 14 shows a modified pulley and cable arrangement; and

Figure 15 is a transverse section taken as indicated by arrows 15—15 of Figure 14.

As shown in Figure 1, the boom, generally designated by the numeral 10, is mounted by means of a tubular base standard 11 on the platform 12 of a motor vehicle truck 13. A cylindrical post 14 is revolubly mounted within member 11, and is also vertically supported thereby, by any suitable arrangements conventional in the art. The upper end of post 14 has a pair of spaced rearwardly projecting mounting brackets 15, between which is mounted, on a horizontal axle 16, a mounting structure 17 for the rearward end of the boom. This mounting structure 17 comprises a pair of side plates 18 connected by a transverse box structure 20 (Figure 2) in which a rearward mounting tube 21 of the boom is firmly seated. The forward portions of the side plates 18 have inwardly bent flange portions 22 which engage and are welded to the tube 21, all as may be clearly understood from Figures 1 and 2. The tube 21 is thus rigidly mounted between the side plates 18 of the mounting structure 17.

The upper end of post 14 also has a pair of spaced forwardly projecting brackets 24, the forward ends of which have any suitable arrangements for supporting the underside of the tube 21 in a vertically adjustable manner. A suitable device for this purpose is completely illustrated in my prior Patent No. 2,571,858. As here indicated, such a device may comprise a jack screw 25 swivelled to the bottom of the tube 21, as indicated at 26, the bracket arms 24 carrying a nut member, not shown, which surrounds the lead screw 25, and which may be rotated, for example, by a gear 27 connected thereto, and a hand crank 28 for rotating gear 27 through any suitable mechanism to effect axial translation of the lead screw. These arrangements form no part of the present invention, and are therefore not further detailed herein. Reference to Patent No. 2,571,858 is made for the details of such a device. Suffice it to say that by this arrangement, the boom 10 may be elevated or depressed about horizontal axle 16.

The boom comprises a plurality of telescoping tubes, the larger tube 30 (Figures 1 and 6) having its rearward end portion enclosed within the mounting tube 21. As shown, the tube 30 engages the tube 21 at the bottom, but is of somewhat smaller diameter than the tube 21, leaving a space 31 along the top. A filler block 32 fills the space between the tube 30 and the tube 21 at the rearward end of the assembly, and is welded in place, as indicated. The forward end of the tube 21 is turned inwardly and shrunk to the tube 30, as indicated at 33. Thus the rearward end portion of the tube 30 is fixedly mounted inside the tube 21, the tube 30 being thereby adequately supported for a substantial distance out from its rearward extremity.

Telescopically received inside the first tube 30 of the telescopic boom is a second tube 34, and telescopically received in the tube 34 is a third tube 35, while telescopically received in tube 35 is a fourth tube 36. As will be seen, the reduction in diameter from tube to tube is sufficient to leave clearance spaces between successive tubes. As shown, the lower sides of tubes 34, 35 and 36 are positioned adjacent the lower sides of tubes 30, 34 and 35, respectively, leaving cable channels 37, 38 and 39, respectively, at the top. At the rearward ends of the telescopic tubes or boom sections 34, 35 and 36 are spacing collars 40, 41 and 42, respectively, welded to the corresponding tubes, and dimensioned to be receivable with a free sliding fit inside the tubes 30, 34 and 35, respectively. It will be seen that the collars 40, 41 and 42 consist of spacers to position the corresponding telescopic tubes of the boom in eccentric positions with respect to the next larger tubes in which they are disposed, to assure maintenance of the described cable channel clearance spaces 37, 38 and 39; also that the upper surfaces of these collars have slide bearing on the inner upper surfaces of the surrounding tubes. Each tube of the boom exerts an upward thrust on the next larger tube through its described collar, and exerts a downward thrust on the next larger tube near the outer end of the latter. To receive this downward thrust, each tube is accordingly provided with a suitable wear resistant half round bearing bushing 45, such as shown best in Figure 5.

The forward end of the outermost tube 36 of the boom carries a hooded support 55 for a pulley 56 in alinement with the hollow space inside the boom, and a cable 57 extending through the boom passes over this pulley 56 and carries a suitable implement such as a hook 58 at its end. At the rearward end portion of the boom, this cable 57 is wound on a winding drum 59, here shown as operable through a suitable gear train, generally designated at 59a (Figure 2), from a hand crank on a shaft 62 projecting through one of the side plates 18.

Consideration will now be given to the means for extending the first extensible tube 34 from the lowermost tube 30. A fairly heavy cable is employed, doubled to form two halves, connected by a bight, the two ends being wound on a winch 60 (Figure 2) mounted between side plates 18. This winch has two winding drum sections 60a and 60b, separated by a disk 60c. The two ends of the cable are fastened on opposite sides of the disk 60c, and separately wound on the two drum sections 60a and 60b, thus preventing interference with one another and assuring proper winding and unwinding of the two end portions of the cable. The winch 60 has at one end a gear 61, with which meshes a small spur gear 61a on a shaft 63, and a larger gear 64 on said shaft is driven through small spur gear 65 from a shaft 66. Shaft 66 may be driven through pulley 67 from an electric motor (not shown) mounted on the structure 17, or may be driven by means of a crank such as 68 engageable with the protruding end of either shaft 66 or shaft 63. It will be evident that when the crank is engaged with the shaft 66, the manual drive will be at much lower gear ratio than when the crank is engaged with the shaft 63. For heavy work, such as this boom is particularly designed to handle, it is usually preferable to employ the motor drive.

Two cable flights 70 and 71 extend from the two cable ends wound on drum 60 in a forward or outward direction over tube 30 to a pair of close spaced pulleys 72 and 73, respectively (Figure 3), mounted for rotation on a shaft 74 within a box structure 75 welded to the top side of the tube 30 near the forward or outer end of the latter, the pulleys being separated by a spacer 74a. The box structure 75 includes side plates 76, in which the pulley shaft 74 is mounted, and a top plate 77. The two pulleys 72 and 73 receive between them a longitudinal key 50 on the top side of boom section 34 (Figure 3) to constrain section 34 against rotation. The key 50 does not show in Figure 6 because the plane of said figure is taken just behind said key.

The top side of the tube 30 is apertured opposite the pulleys 72 and 73, as indicated at 80 in Figures 4 and 6, and the lower portions of the pulleys are received in this aperture, and are so positioned that the two flights 70a and 71a of the cable running off the lower sides of the pulleys (understood to follow the flights 70 and 71, respectively) are guided into the channel space 37 between the top inner side of the tube 30 and the top outer side of the tube 34. These two cable flights 70a and 71a extend rearwardly in the cable channel space 37 in substantial parallelism to a pair of pulleys 84 and 85, respectively, mounted by means of angularly disposed brackets 86 welded to the rearward face of the collar 40 on the rearward end of the tube 34. The cable flights 70a and 71a are passed rearwardly through holes 87 in the upper portion of collar 40 (see Figure 9). The pulleys 84 and 85 are so positioned between bracket 86 as to receive the end portions of the two cable flights 70a and 71a from these holes 87 and to return the cable as forwardly reaching flights 70b and 71b, which pass through other holes 88 (Figure 6) positioned outwardly towards the two sides of the collar. Figures 6 and 9 illustrate how the brackets 86 position the pulleys 84 and 85 in angular relationship to guide the cable as described.

The forwardly reaching cable flights 70b and 71b pass out of the forward end of the tube 30 around grooved half-round guides 90 and 91 disposed in vertical planes and mounted in housings 92 welded to opposite sides of the forward end of the pipe 30. As clearly illustrated, the guides 90 and 91 receive the forwardly reaching cable flights 70b and 71b, the portions 70c and 71c of the cable returned by these guides forming the bight 95 at the mid point of the doubled cable. This bight is looped around the aforementioned pulley housing 75 and is received and supported by a grooved equalizing guide 96 welded to the rearward side of the housing 75 at a level just above the top side of the tube section 30. This guide 96 is formed with groove 97 to receive the cable, and its two wings are arcuately formed at the extremities and positioned in line with the top ends of the guides 90 and 91.

In operation, winding up of the two end portions of the cable on winch 60 results in shortening the cable loops engaged with the pulleys 84 and 85, thereby extending the tube 34 from the tube 30. Stresses in the two halves of the cable will be equal because of the looping of its bight around the equalizing member 96. If at the start one of the two halves of the doubled cable should be longer than the other, the shorter is placed under greater tension, and the cable shifts around the equalizing member 96 until the two cable halves are of the same length and bear equal shares of the total load.

Tube 35 has at the top a key 98, which is received in a guide 99 inside the tube 34 to prevent rotation of tube 35.

For the purpose of extending the tube 35 from the tube 34, a cable 100 is employed, the two end portions of which are clamped or anchored by a clamping means 102 mounted to the rear of the pulley housing 75, as shown in Figures 4, 6 and 13. A double grooved guide member 105 is mounted on the rear of the housing member 75, just above the equalizing member 96. A clamp plate 106 grooved in opposite sides is welded to and extends rearwardly from the center of guide 105, and the clamping means 102 is completed by clamp blocks 107 and suitable screws. The two ends of the cable 100 are thus clamped to the plate 106 by clamp blocks 107. As here shown, plate 106 interrupts the upper groove of guide 105 at the center, but not the lower groove thereof, since the cable is to run entirely around the lower groove. Two fights 110 and 111 of this cable 100 extend from the clamped cable ends around the upper grooves in opposite sides of the guide member 105, passing to opposite sides of the pulley housing 75 and going onto the inner grooves of doubly grooved pulleys 112 (Figure 7) mounted in pulley housings 113 welded to the top of tube 34 near the forward or outer end of the latter. The housing members 113 are spaced apart and positioned in angular planes as indicated in Figure 7, so that the upper sides of the pulleys are positioned to receive the cable flights 110 and 111 leading forwardly from the two ends of guide member 105. The lower portions of these pulleys project through apertures 119a in the tube 34, so as to guide the cable into the cable channel space 38 between the tubes 34 and 35, in the manner clearly shown in the drawings. The flights 117 and 118 running off the under sides of the inner grooves of these pulleys 112 are thus guided into the cable channel space 38, and continue rearwardly therein to be looped around grooved half-round guides 125 mounted on the upper portion of collar 41 at the inner end of the tube 35, suitable apertures 126 being provided in the collar 41 to pass the cables (Figures 10 and 12). The cable flights 117 and 118 are continued, beyond the guides 125, by forwardly reaching flights 122 and 123, respectively. These latter run onto the undersides of the outer grooves of the previously mentioned pulleys 112, becoming return flights 124 and 128 extending rearwardly from the tops of pulleys 112. These return flights lead around opposite sides of pulley housing 75 to opposite ends of the lower groove of guide 105, forming a central loop or bight 129 around this groove at the mid point of the cable.

Now, when tube 34 is extended from tube 30 as aforesaid, the cable loops or bights around the guides 125 at the inner ends of the tube 35 are necessarily shortened, causing extension of tube 35 from tube 34. All flights of the cable will necessarily equalize their share of the load, because of the provision of equalizing guides 125 and the continuous lower groove of the guide 105, about which the central unanchored cable loop 129 can adjust itself to equalize any difference in tension between the multiple flights of the cable.

The tube 36 is extended from the tube 35 in a precisely similar manner using a cable 130 whose two ends are anchored at 131, and which is arranged about a guide member 137 like the guide member 105, doubly grooved pulleys 138 and 139, and half-round guides 140 on collar 42 at the inner end of tube 36, in the same way as the cable 100 is strung about guide 105, the doubly grooved pulleys 112, and the guides 125, the only difference being that the pulleys 138 and 139 are mounted at a wider V-angle than the pulleys 112, so as to keep the cables clear of one another.

It will be seen that I have provided multiple cable arrangements for extending the telescoping tubes of the boom, and have arranged all cables to equalize the load between their several flights, so that the load will be equally shared and no one cable flight subjected to overstrain while another flight remains slightly slack. The boom as thus described is well adapted for carrying heavy loads, considerably heavier than could be imposed with any arrangement employing single cables. As mentioned in the introductory part of the specification, there is a limitation upon the size of cable which can be easily used in such an apparatus as the present. When that limit is reached, further increase in carrying capacity can be achieved only by multiplied cable arrangements, and the multiple cable arrangement provided by the present invention assures greatly increased load capacity, without liability of unduly straining a given cable flight in the multiplied arrangement.

In Figures 14 and 15 I have shown, somewhat diagrammatically, a modified cable and pulley arrangement for extending the tube 34 from the tube 30. Here, two halves 148 and 149 of a single doubled cable pass over individual pulleys 150 and 151 mounted on the outer end of outside tube 30, thence rearwardly between the tubes 30 and 34, through holes, such as indicated at 152 and 152', in collar 40a, around pulleys 153 and 154 individually rotatable in a housing 155 mounted on collar 40a, thence forwardly through holes 156 and 157 to the forward end of tube 30, the bight of the cable being passed around a half-round equalizing guide 158 mounted on the forward end of tube 30. It will be appreciated that this arrangement is equivalent in operation to that first described, but is somewhat simpler in structure, and shorter in overall cable length. The load is again distributed equally between the two strands 148 and 149 of the single cable.

The drawings and description will be understood as merely illustrative of one present embodiment of the invention, and it will be understood that various changes in design, structure and arrangement may be made without departing from the spirit and scope of the invention or of the appended claims.

I claim:

1. A hoisting boom structure comprising at least two telescoping tubes, a first of which is adapted for pivotal mounting on a base member, and a second of which is telescopically received within the first tube, said second tube being sufficiently smaller than said first tube to leave a clearance space therebetween, a spacer on the inner end portion of said second tube bearing on the inside of the first tube and positioning said tubes with a cable channel space therebetween extending longitudinally from said spacer to the forward end portion of the first tube, and means for extending the second tube from the first tube including a doubled cable having a bight, an equalizing guide on the forward end portion of the first tube around which the bight of said cable is looped and arranged for tension adjustment movement thereabout, guides mounted at the forward end of said first tube for taking the two cable flights extending forwardly from said equalizing guide and turning them rearwardly into the cable channel space between the first and second tubes, pulleys mounted on the rearward end portion of the second tube around which the cable flights from said guides are looped and extended forwardly in said cable channel space, and pulleys mounted on the forward end portion of the first tube around which the forwardly extending cable flights returning from the last mentioned pulleys are looped and extended rearwardly outside the boom structure, and winding drum means for taking up and paying out the two cable flights extending rearwardly outside the boom structure.

2. A hoisting boom structure comprising at least two telescoping tubes, a first of which is adapted for pivotal mounting on a base member, and a second of which is telescopically received within the first tube, said second tube being sufficiently smaller than said first tube to leave a clearance space therebetween, a spacer on the inner end portion of said second tube having bearing on the inside of the first tube and positioning said tubes with a cable channel space therebetween extending longitudinally from said spacer to the forward end portion of the first tube, and means for extending the second tube from the first tube including a doubled cable having a bight, an equalizing guide on the forward end portion of the first tube around which the bight of said cable is looped and arranged for tension adjustment movement thereabout, the two cable flights from said bight being arranged to extend rearwardly through the cable channel space between the first mentioned tube and the second mentioned tube, pulleys mounted on the rearward end portion of the second tube around which the cable flights from said bight are looped and extended forwardly in said cable channel space, and pulleys mounted on the forward end portion of the first mentioned tube around which the forwardly extending cable flights returning from the last mentioned pulleys are looped and extended rearwardly outside the boom structure, and winding drum means for taking up and paying out the two cable flights extending rearwardly outside the boom structure.

3. The subject matter of claim 2, wherein said winding drum means comprises two separated drum sections for the two cable flights.

4. The subject matter of claim 2, wherein said equalizing guide comprises a forwardly facing guide element mounted on the forward end of the first tube in alinement with the cable channel space between the first and second tubes.

5. The subject matter of claim 2, wherein said equalizing guide comprises a rearwardly facing guide element mounted on the outside of the first tube near the forward end thereof, and including guides on the forward end of the first tube for guiding the cable portions extending from said equalizing guide into the cable channel space between the first and second tubes.

6. In a hoisting boom structure including at least three telescoping tubes, a first of which telescopically receives a second thereof, and a third of which is telescopically received in said second tube, said third tube being sufficiently smaller than said second tube to leave a cable channel space therebetween, and means for extending the second tube from the first tube, the combination with said structure of: means for extending the third tube from the second tube during and by virtue of extension of the second tube from the first tube including a cable having two ends and a bight, securing means securing the two ends of said cable to the first tube, pulleys for said cable on the forward end portion of the second tube, said pulleys receiving flights of said cable reaching forwardly from said secured ends and being positioned to turn said cable flights into alinement with the cable channel space between the second and third tubes, the cable portions so turned into alinement with said cable channel space forming two flights extending rearwardly in said space, guides on the rearward end portions of said third tube around which the last mentioned cable flights are looped to form two forwardly reaching cable flights, pulleys on the forward end portion of said second tube receiving said last mentioned cable flights and turning the cable portions rearwardly to form two final rearwardly extending flights which terminate in said bight, and an equalizing guide on said first tube about which said bight is looped for anchorage and tension adjustment movement.

CLAUDE B. GARLAND.

No references cited.